(12) United States Patent
Veeneman et al.

(10) Patent No.: US 6,771,650 B1
(45) Date of Patent: *Aug. 3, 2004

(54) HYBRID ROUTED ATM PATHS

(75) Inventors: Ron Veeneman, Carleton Place (CA); Richard Burke, Vanier (CA); Ashish Duggal, Ottawa (CA); Simon Nadezhdin, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/293,811

(22) Filed: Apr. 19, 1999

(51) Int. Cl.[7] .................................................. H04J 5/00
(52) U.S. Cl. ................................................... 370/397
(58) Field of Search ............................... 370/232, 253, 370/218, 522, 392, 402–406, 465, 420–428, 410, 254–256, 389–397, 395.1; 707/182; 714/774; 709/224

(56) References Cited

U.S. PATENT DOCUMENTS

| | | | | |
|---|---|---|---|---|
| 5,521,909 A | * | 5/1996 | Holloway et al. | 370/404 |
| 5,699,369 A | * | 12/1997 | Guha | 714/774 |
| 5,884,297 A | * | 3/1999 | Noven | 370/395 |
| 5,949,756 A | * | 9/1999 | Kienberger et al. | 370/232 |
| 6,125,119 A | * | 9/2000 | Cherukuri et al. | 370/410 |
| 6,148,001 A | * | 11/2000 | Soirinsuo et al. | 370/420 |
| 6,167,041 A | * | 12/2000 | Afanador | 370/353 |
| 6,185,215 B1 | * | 2/2001 | Aho | 370/402 |
| 6,188,690 B1 | * | 2/2001 | Holden et al. | 370/390 |
| 6,256,295 B1 | * | 7/2001 | Callon | 370/254 |
| 6,301,257 B1 | * | 10/2001 | Johnson et al. | 370/406 |
| 6,353,594 B1 | * | 3/2002 | Tooker et al. | 370/218 |
| 6,400,681 B1 | * | 6/2002 | Bertin et al. | 370/218 |
| 6,490,621 B1 | * | 12/2002 | Forget et al. | 709/224 |
| 6,563,827 B1 | * | 5/2003 | Brueckheimer et al. | 370/395.1 |

* cited by examiner

Primary Examiner—Chi Pham
Assistant Examiner—Prenell Jones
(74) Attorney, Agent, or Firm—Marks & Clerk

(57) ABSTRACT

A system and method for routing permanent virtual connections (PVCs) and soft permanent virtual connections (SPVCs) through a digital communications network such as an ATM network. The permanent virtual connections are routed via algorithms executed by a central network management entity. The SPVCs are routed via switched virtual circuit algorithms implemented by management entities located at network switching elements.

19 Claims, 5 Drawing Sheets

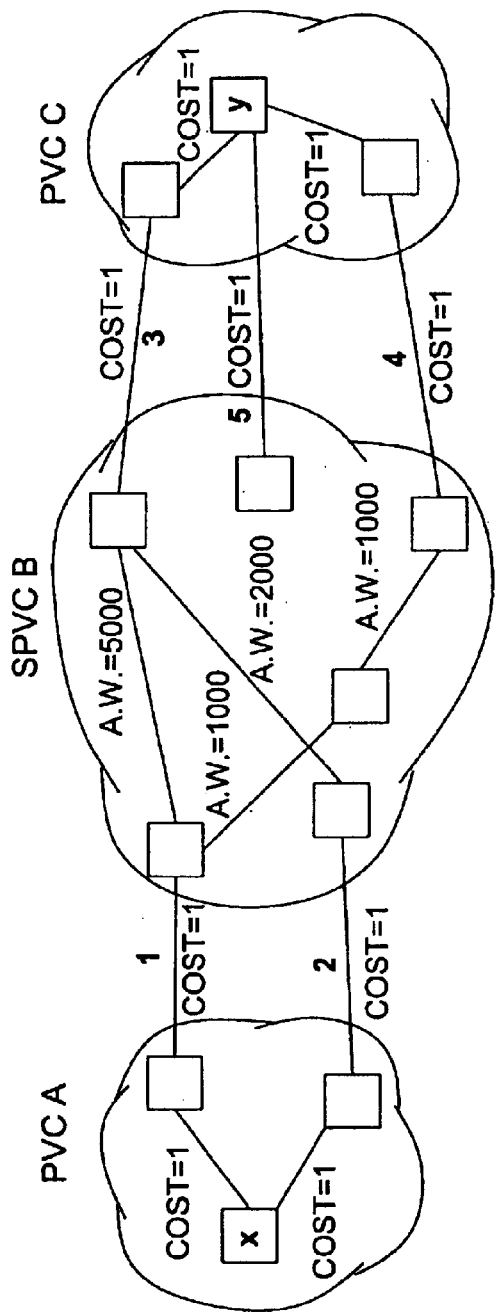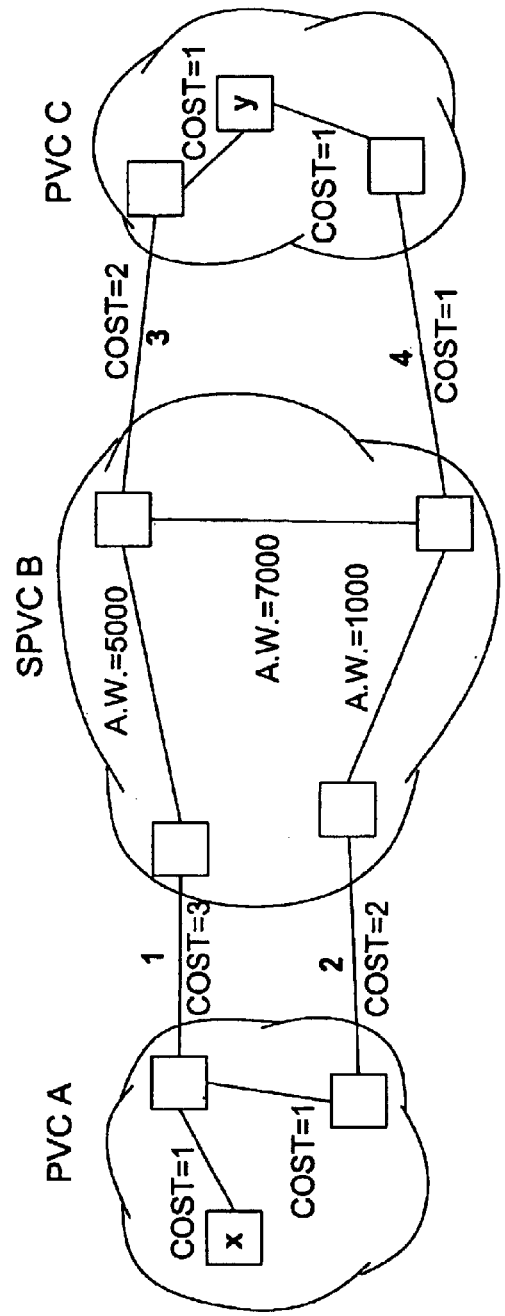
FIG. 4
FIG. 5

HYBRID ROUTED ATM PATHS

FIELD OF THE INVENTION

This invention relates to digital communications networks having permanent virtual connections (PVCs) and switched virtual connections (SVCs) and more particularly to a central management entity that employs a hybrid routing scheme to route cell traffic through such a network.

BACKGROUND

Within the domain of centrally managed asynchronous transfer mode (ATM) networks, ATM Virtual Channel Connections (VCCs) and Virtual Path Connections (VPCs) have traditionally been routed through the network by the network management entity. This management entity, having complete knowledge of the network topology and the resource utilization within the network, selects routes for individual VCCs through the network based on a series of stored algorithms. These algorithms enable the management entity to bias the routing of VCCs and VPCs in order to maximize network utilization while minimizing cell delay, and to either balance the load throughout the network or to route the connections based on user assigned cost. These centrally managed and routed VCCs are referred to as Permanent Virtual Connections (PVCs).

Switched Virtual Connection (SVC) capabilities are now emerging within these centrally managed ATM networks. These SVC capabilities enable the network elements (also known as switches or nodes) to route VCCs through the network in response to routing requests from attached ATM devices, without the aid of a management entity. The central network management entity can leverage the SVC routing capabilities of these networks for routing centrally managed VCC paths, thereby taking advantage of the improved routing efficiency and performance associated with distributed routing. This is accomplished by enabling the network elements to accept routing requests from management entities. Whenever VCC paths are configured to use SVC routing, the central management entity does not perform any routing whatsoever; it simply sends a routing request to the network element. VCC paths that are routed in this way are known as Switched Permanent Virtual Connections (SPVCs).

The manner in which the SVC capabilities are emerging within networks often leads to networks that are only partially SVC capable. For VCC paths that must traverse both SVC capable network segments and non-SVC capable segments, the management entity is forced to use PVC routing, even across the SVC capable network segment(s). This deficiency results in an inability of the central management system to take advantage of the performance improvements offered by the SVC capable network segments.

The present invention addresses strategies that enable the central management entity to employ both PVC routing and SPVC routing techniques for individual ATM paths.

The strategies employed by this invention overcome the deficiencies noted above by allowing the central management entity to apply the traditional PVC routing algorithms in conjunction with SVC routing capabilities during the routing process of individual ATM paths (VCCs and VPCs).

SUMMARY OF THE INVENTION

It is an objective of the present invention to provide a network management entity that employs hybrid routing algorithms to route cell traffic through both PVC and SPVC capable portions of a network.

Therefore, in accordance with the first aspect of the present invention there is provided a method of routing a virtual circuit (VC) through a digital communications network having both Switched Permanent Virtual Circuit (SPVC) capable switching nodes and nonSPVC capable switching nodes, the method comprising: providing a central network management entity having means to route the VC through the non-SPVC capable nodes utilizing Permanent Virtual Circuit (PVC) routing algorithms; and providing SPVC capable nodes for cooperating with the network management entity to route the VC through the SPVC capable nodes utilizing Switched Virtual Circuit (SVC) routing algorithms.

In accordance with a second broad aspect of the invention there is provided a system for routing a virtual circuit (VC) through a digital communications network having both Switched Permanent Virtual Circuit (SPVC) capable switching nodes and non-SPVC capable switching nodes, the system comprising: a central network management entity having means to route the VC through the non-SPVC capable nodes utilizing Permanent Virtual Circuit (PVC) routing algorithms; and means at the SPVC capable nodes to cooperate with the network management entity to route the VC through the SPVC capable nodes utilizing Switched Virtual Circuit (SVC) routing algorithms.

BRIEF DESCRIPTION OF THE DRAWINGS

The invention will now be described in greater detail with reference to the attached drawings wherein:

FIG. 4 illustrates route selection options with a SPVC virtual path connection link;

FIG. 5 illustrates a selection scheme based on least cost for a non-SPVC segment;

DETAIL DESCRIPTION OF THE INVENTION

Figure 1:
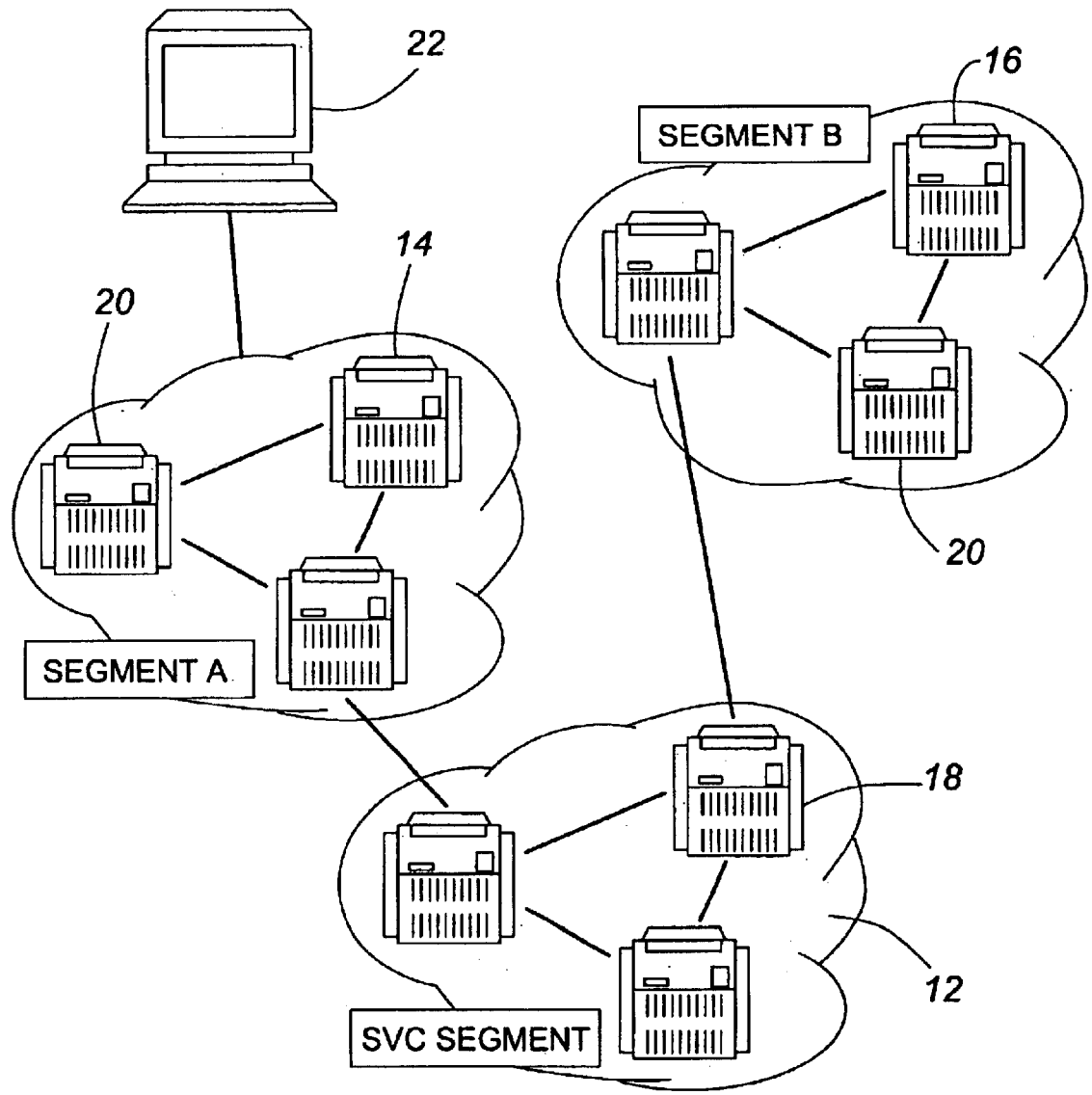
FIG. 1 is a high level diagram of centrally managed network having both SVC and non-SVC portions.

FIG. 1 represents a high level diagram of a digital communications network having an SVC capable portion or cloud 12 and non-SVC capable portions or clouds 14 and 16. Multi-service switches 18 having integral element management entities are located within SVC cloud 12. Examples of such multi-service switches include the MainStreetXpress 36170 available from Newbridge Networks Corporation. The MainStreetXpress 36170 Multi-Services Switch will be known hereafter as a 36170. Non-SVC capable clouds 14, 16 include switches 20 that typically do not have integral element management entities but instead rely on the central network management entity 22 for routing algorithms. Examples of switches 20 include access switches such as MainStreetXpress 36140 switches and MainStreetXpress 36150 switches both also available from Newbridge Networks Corporation. Network management entity 22 may be Newbridge's MainStreetXpress 46020 Network Manager known hereafter as a 46020.

By modeling the SVC capable switches 18 within a SVC capable portion of the network 12, the central management entity 22 can extend the traditional PVC routing algorithms thereby allowing traversal of these segments while selecting routes for individual VCC paths. This allows the management entity to use PVC routing techniques to traverse the non-SVC capable segments of the network and also allows it to use SPVC routing techniques to traverse the SVC capable portion of the network.

This results in the ability to leverage the improved routing efficiency and performance associated with SVC routing without sacrificing the biasing properties associated with traditional PVC routing techniques.

The strategy set out above does not limit the number of SVC or non-SVC segments within the network. Nor does it dictate that the endpoints of the VCC paths must end on non-SVC segments. As well, it does not dictate that the non-SVC segments only contain ATM equipment. This invention also allows other traffic such as TDM and Frame Relay to be routed through the SVC capable portion of the network using the central management entity.

Figure 2:
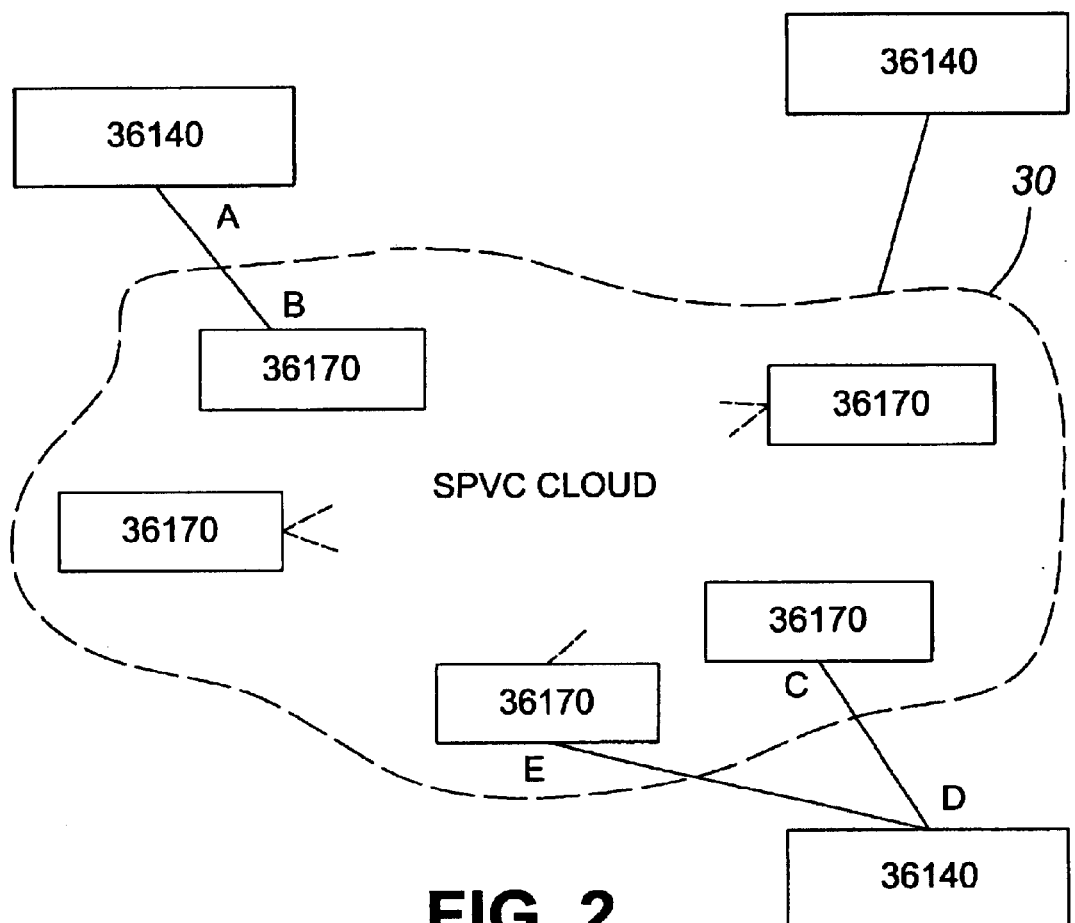
FIG. 2 illustrates a centrally managed hybrid network model.

FIG. 2 illustrates a typical 46020 managed network that uses PVC and SPVCs paths.

The network of FIG. 2 has a core of SPVC capable 36170 nodes with non-SPVC capable nodes, such as the aforementioned 36140s and/or 36150s, at the edges. In FIG. 2 cloud 30 is formed by the 36170s which are configured to support SPVCs.

The 46020 is able to route a hybrid path by using PVC cross-connects outside of the cloud and using SPVCs when traversing nodes inside the cloud. Such paths are known herein as Hybrid Switched Permanent Virtual Connections (HSPVCs). Management of HSPVC paths requires that the Graphical User Interface (GUI) at the 46020 support previously unavailable features. These include a path and link configuration entity or form that allows a user to choose the hybrid options on Frame Relay, Circuit Switched Voice, Circuit Switched Data, VCC and VPC paths. The path configuration form has an option called "May Use SPVC" that is added to the VC Application field. If the pathends are on SPVC capable nodes, the user will have two options: PVC and SPVC. If one or both of the pathends are on non-SPVC capable nodes the user will be given the following two options: PVC and "May Use SPVC".

With this network model the 46020 is able to set up mixed PVC/SPVC paths. Selecting the "May Use SPVC" option on a path configuration form may result in paths with PVC as well as SPVC portions. Even though the SPVC paths are routed and managed by the 36170 nodes, the Band Width Allocator (BWA), software located in the 46020, will find the end-to-end route for the path through the SPVC cloud. While searching for a route, BWA will use its normal path search outside the cloud. The BWA feature allows the 46020 to set up and monitor VCC, VPC, TDM-over-ATM and Frame Relay over ATM paths comprising PVC and SPVC connections. According to the present invention SPVCs are routed by ATM nodes or switches in the SPVC capable portion of the network.

When the BWA search ends up on a 36170 node inside the cloud (i.e. when it ends up on a node having at least one functioning SPVC VPCL with the same QoS, in one of its trunk group's bandwidth partition, as the path being routed), it will continue its search using SPVC VPC links as well as the non-SPVC links. It will treat the SPVC VPCLs as having cost zero, therefore the SPVC VPCLs traversed by the path do not affect the cost of the path. The sum of the admin weights of the SPVC VPCLs, and the total hop count of the SPVC VPCLs traversed by the path will be used as a tie breaker in case two routes with the same cost are found. In other words, the usual PVC tie breaking rules will be applied before the following are considered for tie breaking (in order of priority high to low): a) the total admin weight of the SPVC VPCLs traversed; b) the total hop count of the SPVC VPCLs traversed (note that the above hop count is not added to the total hop count for the path).

Once the path search is out of the cloud (i.e. the search has been traversing SPVC VPCLs and then traverses a link which is not SPVC VPCL), BWA resumes its normal search through the nodes outside the cloud to the destination. In the current implementation it will not consider using SPVC VPCLs again, thus enforcing the rule that no more than one SPVC portion is allowed per path. Once a route has been found, BWA extracts the PVC and SPVC portions from the route. The first and the last endpoint inside the cloud that are used by the route are the endpoints of the SPVC portion. BWA sends a Master Parameter List (MPL) down to endpoint 1 of the SPVC portion to connect the SPVC. BWA also creates the PVC cross-connects required for the PVC portions of the path. As noted above, in the current implementation no more than one SPVC portion is allowed for the path.

It should be noted that the SPVC-capable nodes in the network will not necessarily use the SPVC VPCLs traversed by the route when routing the SPVC portion of the route. However, the endpoints of the SPVC portion will be the ones requested by the BWA.

Figure 3:
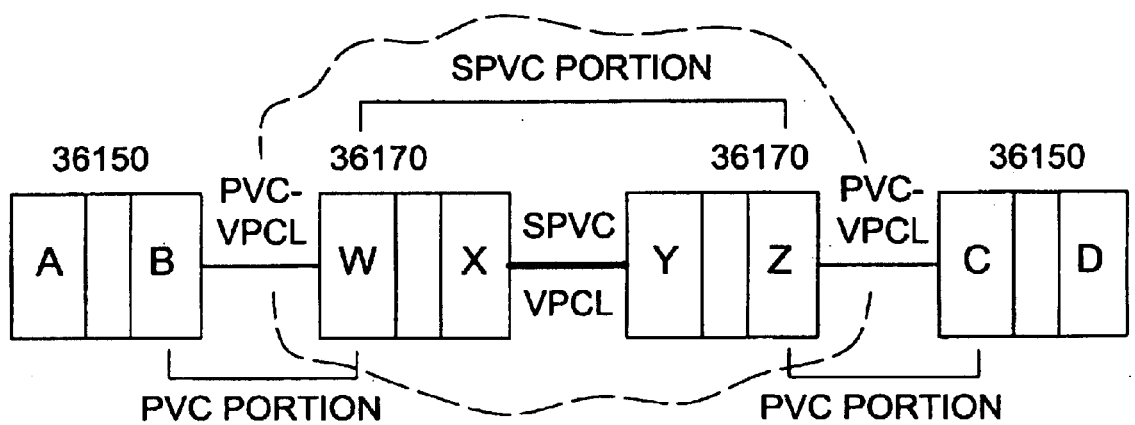
FIG. 3 illustrates PVC and SPVC connection links between PVC and SPVC capable nodes.

Using the illustration in FIG. 3, a hybrid path request between endpoints A and D results in BWA finding two PVC portions and one SPVC portion. W and Z are used as endpoints for the SPVC portion in the cloud. Note that the SPVC portion has to be routed over SPVC VPCLs whereas the PVC portions may or may not use PVC-VPC links.

The routing model is illustrated in FIGS. 4 and 5.

FIG. 4 illustrates the use of the accumulated admin weights of the SPVC VPCLs for connectivity and as a tie breaker. For a HSPVC path from x to y, the route via links 2 and 3 will be chosen because:

- link 5 cannot be used because its host node cannot be reached via SPVC VPCLs
- links 1 and 3 are not used because the accumulated admin weight of the SPVC VPCLs connecting them is 5000.
- links 1 and 4 are not used because the accumulated admin weight is 2000, but 2 SPVC VPCLs are required to connect them, whereas for links 2 and 3 only one SPVC VPCL of admin weight 2000 is needed.

Having chosen the links, the 46020 would connect the HSPVC via PVC cross-connects in the PVC clouds, and via the SPVC connect from the base of link 2 to the base of link 3 in the SPVC cloud.

Note that if the links the path takes to enter and leave the SPVC cloud reside on the same node inside the cloud, the 46020 will request that node to perform a PVC cross-connect for the path rather than requesting it to connect an SPVC. In that case the path would not have an SPVC portion.

FIG. 5 illustrates the preference for optimizing the non-SPVC portion of the HSPVC route. For a HSPVC path from x to y the route via links 1 and 4 will be chosen because it provides the cheapest (cost 6), least hop non-SPVC portion of the route, although the accumulated admin weight of the 2 SPVC VPCLs used for the route is 12000 compared with the admin weight of 1000 that would be accumulated had links 2 and 4 been chosen. That link combination is not chosen because the number of hops in the non-SPVC portion would be higher than with the choice of links 1 and 4.

The hybrid soft permanent virtual connection (HSPVC) can go into a mode known as Waiting For Resource (WFR) due to one of the following conditions:
1) BWA fails to find a route for the path;
2) BWA finds a route, but a PVC cross-connect is Connection Admission Control (CAC) refused by a node;
3) BWA finds a route, but an SPVC connection is CAC-refused by the node at the first endpoint of the connection; or
4) BWA finds a route, but the SPVC section of the path fails to connect.

The actions the 46020 will take to handle these cases are described below case by case. In the following discussion Link Demerit and Link Alternation algorithms are mentioned. Details respecting these algorithms are given in the discussion.
1) BWA will periodically try to route the path (the established functionality).
2) If the Link Demerit functionality is not enabled, the path will be treated the same as in case 1 above. If the Link Demerit functionality is enabled, the Link Demerit algorithm will apply to the path.
3) If neither Link Demerit nor Link Alternation is enabled, the path will be treated the same as in case 1 above. If Link Alternation is enabled, it will be applied to the path. If Link Alternation is disabled, but Link Demerit is enabled, Link Demerit will be applied to the path.
4) If the Link Alternation is not enabled, the path will be treated the same as in case 1 above. If the Link Alternation functionality is enabled, the Link Alternation algorithm will apply to the path.

Figure 6:
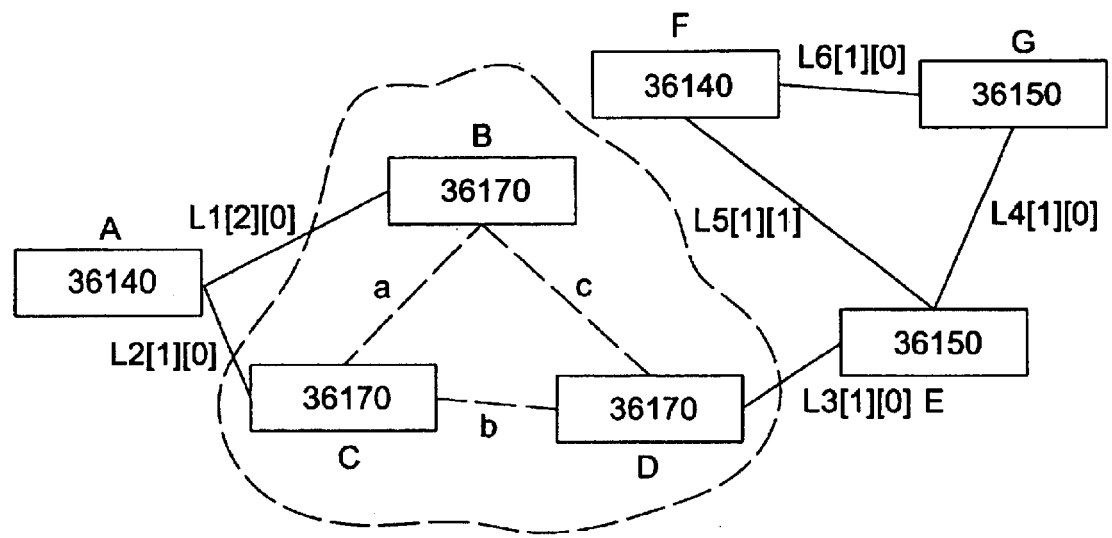
FIG. 6 illustrates a link alternation algorithm for a centrally managed hybrid PVC/SPVC network.

Basically, the Link Demerit algorithm allows bandwidth allocation rules for ATM to consider prior instances of connection request rejects as a valid biasing factor in subsequent path searches. The algorithm is internal to the BWA and generally does not affect other 46020 or 46020 processes (except NW_config). With this feature, a demerit counter is maintained for each ATM link with at least one endpoint outside of the SPVC cloud. For example, in FIG. 6 link L1 has a cost of 1 and a demerit counter of 0. The effective cost of traversing such a link is calculated by adding the demerit counter to the link cost. The demerit is applied whenever a link is considered for routing a call (any call, and not just the call whose routing caused the demerit counter to be incremented).

If a connection request is rejected by a node outside the SPVC cloud, then the demerit counter of the link, which the path would take to reach the rejecting node, is incremented by 1 and after one WFR interval, BWA tries to route the path again taking the effective cost of the links into account. As an example, assume that L5 is fully utilized when a user requests a path between nodes A and F. BWA will find the shortest path A-C-D-E-F which will go WFR. At this point the demerit counter of L5 will be incremented and after one WFR interval, BWA will try to re-route the path and will find the shortest path A-C-D-E-G-F.

The above algorithm won't always work for the case when the SPVC section of the path fails to connect. For example in FIG. 6, if in connecting a path from E to A and links a and b were full (so that the only way to connect the path would be through links L3 and L1), the SPVC section would keep going WFR, the BWA would keep demeriting link L3, and the path would keep staying in WFR. The above problem could be fixed by deciding to demerit not only the link the path uses to enter the SPVC cloud, but the link the path uses to exit the cloud as well. In this case both link L3 and L2 would be demented, and eventually the path would take links L3 and L1 and connect.

However, having made the above change in the algorithm, a different problem may be created. For example, consider the situation in which it is required to connect a path from node D to A (FIG. 6), and links a, b and c are full. The path will go WFR twice, demeriting link L2 by 2 points. At this moment, an attempt is made to connect another path, this time from node C to node A. This path will take link L1 (because the cost of link L2 has become 3). This second path will thus go WFR, and link L1 will be demented. This will cause the first path to take and demerit link L2 again. The first path will thus always be in the way of the second path successfully connecting via link L2.

To alleviate this problem the link demerit algorithm could be changed to make the demerit points apply only when routing the path that caused the demeriting. This way even if the first path demerits link L2, the second path will still use it as having cost 1. But if the demerit points are made to apply on a per-call basis the algorithm could just as well disable the links used by the call when it goes WFR due to an SPVC failure to connect, making the 46020 try different links to route the call in and out of the SPVC cloud. Besides, from the examples above it is clear that this could result in a deadlock situation with demeriting. When applied to the HSPVC case, a demeriting algorithm could probably never be fool-proof. Disabling links instead of demeriting makes the problem simpler and easier to handle.

Figure 7:
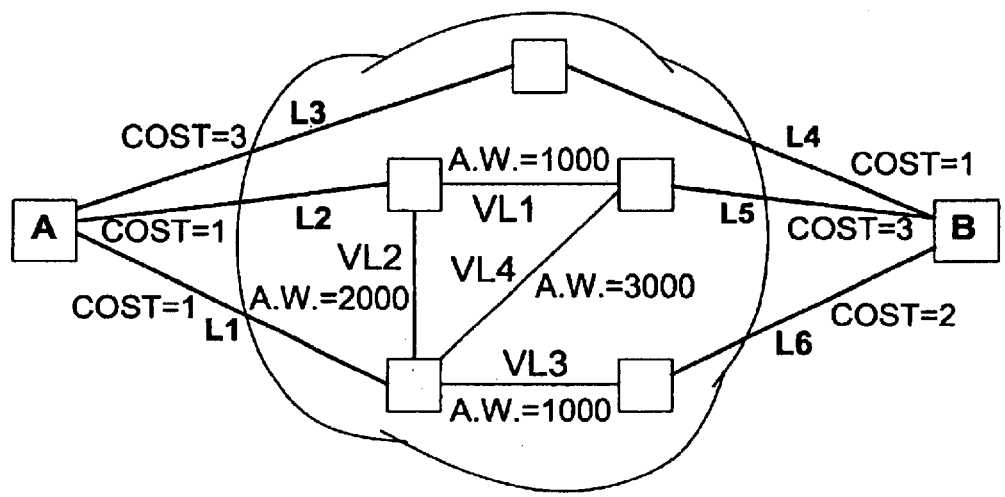
FIG. 7 illustrates a link demerit algorithm for a hybrid PVC/SPVC network.

To illustrate the Link Alteration algorithm, consider FIG. 7. Assume that a call is being routed from A to B, and links VL1 and VL3 are filled to capacity, and the route via links L3 and L4 would be CAC refused by the node inside the SPVC cloud. So the only way the path would connect is via links L1 and L5. The following will occur in the sequence indicated below:
1) The call is routed via links L1 and L6 and goes WFR due to the SPVC failure to connect;
2) Link L6 is disabled for the call;
3) After the WFR retrial period the call is routed through links L3 and L4. CAC refusal is issued for the PVC connection inside the SPVC cloud, and the call goes WFR again;
4) Link L3 is disabled for the call;
5) After the WFR retrial period the call is routed through links L2 and L5 and goes WFR due to the SPVC failure to connect;
6) Link L2 is disabled for the call;
7) After the WFR retrial period the call is routed through links L1 and L5 and connects.

A pseudo-code description of the algorithm follows. Note that the disabling of the links will be done on a per-call basis, so that the links disabled for routing a particular call will still be available for routing other calls.

WHILE the status of call C1 is WFR or Connect Requested DO find a route avoiding the links marked as unsuitable IF the call connects, unmark all the links marked unsuitable by this algorithm and exit.

IF call C1 goes WFR due to a node in the SPVC cloud refusing a connection THEN
 IF there is currently no current incoming link THEN

```
    mark the link the path used to enter the SPVC cloud as
        current incoming
    IF the link the path used to enter the SPVC cloud is not
current incoming THEN
    mark the link which the path used to enter the SPVC cloud
        as temporary unsuitable
    ELSE
    mark the link which the path used to leave the SPVC
        cloud as temporary unsuitable
    ELSE
    IF the call goes WFR because BWA couldn't find a route
    THEN
    IF there is no current incoming link THEN
        unmark all the permanent unsuitable links (disabling links
            lead to impass, so start over)
        ELSE
        mark the current incoming link as permanent unsuitable
            and remove the current incoming label off the link (so
            that we are back to the state when there is no current
            incoming link)
        unmark all the temporary unsuitable links (so they can be
            used again)
        ELSE (the call was refused by a node outside of the SPVC
cloud)
            apply the usual Link Demerit algorithm to the appropriate
                link
END of while.
```

One of the main benefits of using SPVCs in a network is faster rerouting by the nodes in case of a failure. For hybrid PVC-SPVC paths, faster re-routing is still maintained in the SPVC cloud. If there is a failure in the SPVC portion of the network, the nodes will automatically try and reroute the affected path(s). But in scenarios, where the nodes are unable to reroute, the paths(s) will go WFR and will be dealt with as explained previously. This will result is slower rerouting compared to rerouting by the nodes.

Figure 8:
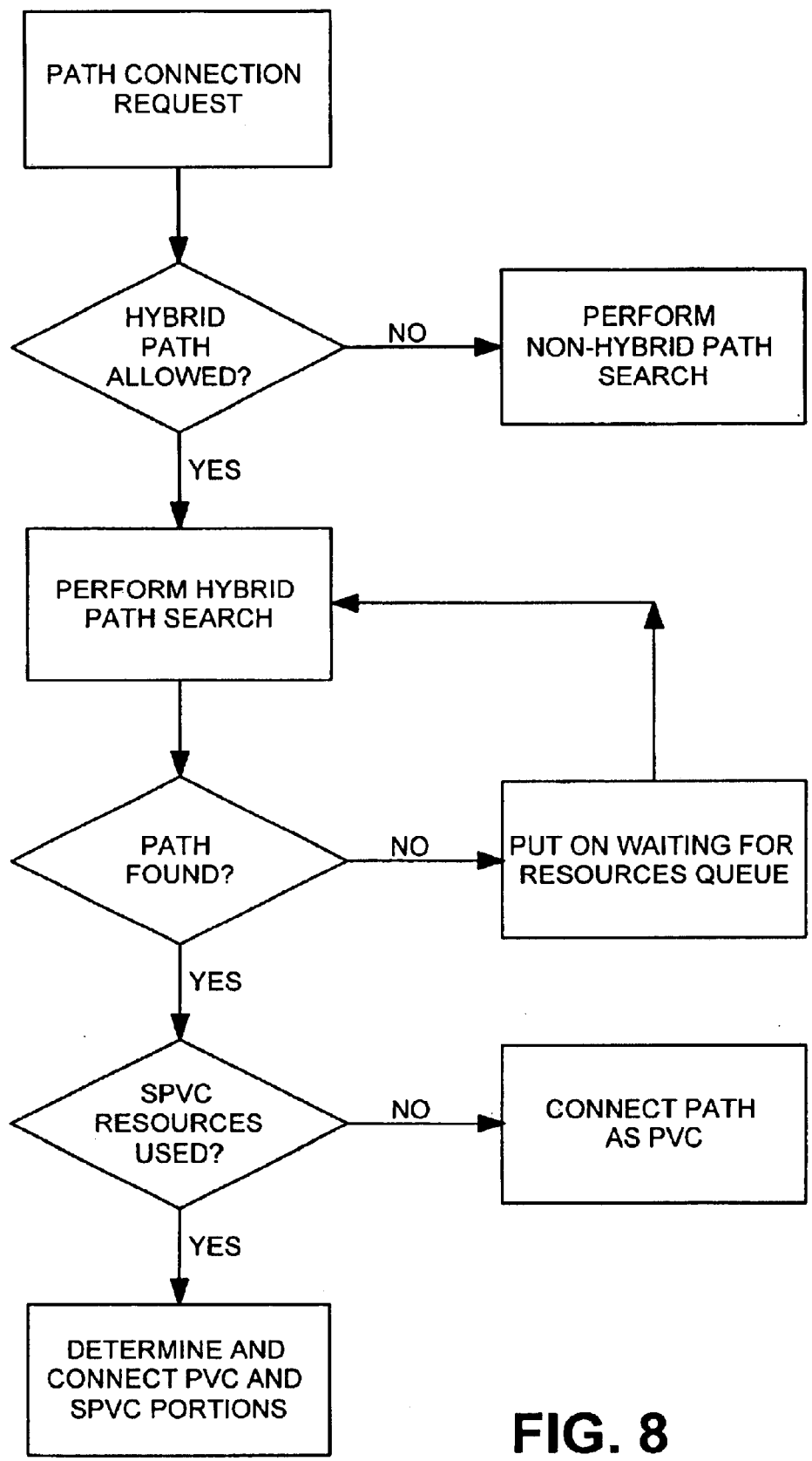
FIG. 8 is an implementation flow diagram of the hybrid PVC/SPVC algorithm according to one aspect of the present invention.

FIG. 8 is a simplified flow diagram setting out an implementation of the hybrid path routing algorithm.

While particular embodiments of the invention have been illustrated and described it will be apparent to one skilled in the art that numerous variations and alternatives can be implemented without departing with the basic concepts of the invention. It is to be understood, however that such variations and alternatives will fall within the true scope of the invention as defined by the appended claims.

What is claimed is:

1. A method of routing traffic through switching nodes in a digital communications network, said switching nodes including nodes having integral element management entities for routing switched virtual connections (SVC) and switching nodes which rely on a central management entity for routing permanent virtual connections (PVC), said method comprising the implementation of a hybrid routing scheme whereby the central management entity routes traffic through centrally managed switching nodes utilizing PVC routing schemes and through switching nodes having integral element management entities utilizing SVC routing schemes.

2. The method as defined in claim 1 wherein said central management entity utilizes a path and link configuration entity to chose a path through said network.

3. The method as defined in claim 2 wherein a bandwidth allocator (BWA) in said central management entity implements the path and link configuration entity to locate an optimum end to end path through the respective switching nodes.

4. The method as defined in claim 3 wherein said path is selected based on an administration weight criteria.

5. The method as defined in claim 3 wherein said path is selected based on a least hop count.

6. The method as defined in claim 3 wherein said BWA implements a link demerit function to select a path, said demerit function taking into account prior rejection of path selection.

7. The method as defined in claim 3 wherein said BWA implements a link alteration function to select a path.

8. A system for routing traffic through switching nodes in a digital communications network, said switching nodes including nodes having integral element management entities for routing switched virtual connections (SVC) and switching nodes which rely on a central management entity for routing permanent virtual connections (PVC), said system comprising means to implement a hybrid touting scheme whereby the central management entity routes traffic through centrally managed switching nodes utilizing PVC routing schemes and through switching nodes having integral element management entities utilizing SVC routing schemes.

9. The system as defined in claim 8 having a Bandwidth Allocator (BWA) to route traffic through respective switching nodes.

10. The system as defined in claim 9 wherein said traffic is Frame Relay based.

11. The system as defined in claim 9 wherein said traffic is ATM based.

12. The system as defined in claim 9 having means to implement a waiting for resource (WFR) mode when BWA is unable to locate a route through the network.

13. A method as defined in claim 1 wherein said digital communication network employs asynchronous transfer mode (ATM) technology.

14. A method as defined in claim 13 wherein said virtual circuit is an ATM virtual channel connection (VCC).

15. A method as defined in claim 13 wherein said virtual circuit is an ATM virtual path connection (VPC).

16. A method as defined in claim 13 wherein said virtual circuit is a time division multiplex (TDM) over ATM connection.

17. A method as defined in claim 13 wherein said virtual circuit is a Frame Relay (FR) over ATM connection.

18. In a digital communications network a network management entity having hybrid routing means to route cell traffic through Permanent Virtual Connection (PVC) and Switched Permanent Virtual Connection (SVPC) capable portions of said communications network wherein said cell traffic is Time Division Multiplexed (TDM) traffic wherein permanent virtual circuit routing algorithms are used to route cell traffic through permanent virtual connection portions of said network.

19. A network management entity as defined in claim 18 wherein switched virtual connection routing algorithms are used to route SVPCs through said network.

* * * * *